United States Patent
Seth et al.

(10) Patent No.: US 10,291,750 B1
(45) Date of Patent: May 14, 2019

(54) AGGREGATING DATA SESSIONS BETWEEN AUTONOMOUS SYSTEMS

(71) Applicant: Juniper Networks, Inc., Sunnyvale, CA (US)

(72) Inventors: Sameer Seth, Bangalore (IN); Abhishek Sudhakar Mudumbi, Bangalore (IN); Murali Mohan Krishnamurthy, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 51 days.

(21) Appl. No.: 15/377,493

(22) Filed: Dec. 13, 2016

(51) Int. Cl.
*H04L 12/26* (2006.01)
*H04L 12/28* (2006.01)
*H04L 12/16* (2006.01)
*H04L 29/06* (2006.01)
*H04L 12/801* (2013.01)
*H04L 29/08* (2006.01)

(52) U.S. Cl.
CPC ............ *H04L 69/166* (2013.01); *H04L 47/34* (2013.01); *H04L 69/326* (2013.01)

(58) Field of Classification Search
CPC ...... H04L 69/166; H04L 47/34; H04L 69/326
See application file for complete search history.

(56) References Cited

U.S. PATENT DOCUMENTS

| | | | |
|---|---|---|---|
| 5,774,656 A | 6/1998 | Hattori et al. | |
| 6,098,172 A | 8/2000 | Coss et al. | |
| 6,680,976 B1 | 1/2004 | Chen et al. | |
| 6,829,254 B1 * | 12/2004 | Rajahalme | H04L 12/5601 370/466 |
| 6,879,561 B1 | 4/2005 | Zhang et al. | |
| 6,944,168 B2 | 9/2005 | Paatela et al. | |
| 6,970,450 B1 * | 11/2005 | Scott | H04L 29/06 370/352 |
| 7,107,354 B2 * | 9/2006 | Scholte | H04L 45/00 709/228 |
| 7,305,546 B1 | 12/2007 | Miller | |
| 7,324,527 B1 * | 1/2008 | Fraas | H04Q 11/0478 370/401 |

(Continued)

FOREIGN PATENT DOCUMENTS

EP          0923211 A2 *  6/1999 ............. H04L 29/06

*Primary Examiner* — Maharishi V Khirodhar
(74) *Attorney, Agent, or Firm* — Shumaker & Sieffert, P.A.

(57) ABSTRACT

The techniques include communicating a plurality of TCP data segments from different TCP connections as a single TCP data segment via a TCP gateway connection. For example, network host devices of autonomous systems may ordinarily transfer TCP data segments across dedicated TCP connections. An Autonomous System Boundary Router (ASBR) on one end of the TCP gateway connection may intercept TCP data segments from different TCP connections and may append the TCP data segments as a single appended TCP data segment and communicated via the TCP gateway connection. An ASBR on the other end of the TCP gateway connection may separate TCP data segments from the appended TCP data segment and determine, based on connection flow information, the TCP connections associated with each of the separated TCP data segments. The ASBR may then forward the separated TCP data segments to their original destinations.

22 Claims, 6 Drawing Sheets

(56) References Cited

U.S. PATENT DOCUMENTS

| | | | |
|---|---|---|---|
| 7,936,705 B1* | 5/2011 | Boland | H04Q 3/0045 |
| | | | 370/260 |
| 8,363,549 B1* | 1/2013 | Zhu | H04L 63/0218 |
| | | | 370/225 |
| 8,811,308 B1* | 8/2014 | Goodson | H04L 47/125 |
| | | | 370/329 |
| 2002/0095400 A1 | 7/2002 | Johnson et al. | |
| 2002/0191600 A1* | 12/2002 | Shah | H04L 29/06 |
| | | | 370/389 |
| 2002/0194345 A1 | 12/2002 | Lu et al. | |
| 2006/0198376 A1 | 9/2006 | Takamichi | |
| 2006/0242313 A1 | 10/2006 | Le et al. | |
| 2007/0091804 A1 | 4/2007 | Pan et al. | |
| 2007/0127424 A1* | 6/2007 | Kwon | H04L 1/1614 |
| | | | 370/338 |
| 2007/0156869 A1 | 7/2007 | Galchev et al. | |
| 2008/0025230 A1 | 1/2008 | Patel et al. | |
| 2009/0219939 A1* | 9/2009 | Isosaari | H04L 29/06027 |
| | | | 370/400 |
| 2009/0296738 A1* | 12/2009 | Shimada | H04L 47/10 |
| | | | 370/474 |
| 2015/0341389 A1* | 11/2015 | Kurakami | H04L 63/20 |
| | | | 726/1 |
| 2016/0191672 A1* | 6/2016 | Perlman | H04L 69/161 |
| | | | 370/474 |

\* cited by examiner

US 10,291,750 B1

AGGREGATING DATA SESSIONS BETWEEN AUTONOMOUS SYSTEMS

TECHNICAL FIELD

This disclosure relates to computer networks and, more particularly, to delivery of network-based traffic.

BACKGROUND

A computer network is a collection of interconnected network devices that exchange data and share resources. In a packet-based network, such as the Internet, the network devices communicate data by dividing the data into small blocks called packets. The packets are individually routed across the network from a source device to a destination device. The destination device extracts the data from the packets and assembles the data into its original form.

When two network devices communicate, the devices establish a communication session using a communication protocol, such as the Transmission Control Protocol (TCP). Network devices, such as routers and switches, forward packet flows associated with the communication session through the physical network that connects the devices. Each TCP session, for example, typically includes two packet flows in opposite directions between the network devices. Each flow of packets between the devices for a TCP session is commonly referred to as a TCP flow or a TCP stream.

SUMMARY

In general, this disclosure describes techniques for communicating a plurality of TCP data segments from different TCP connections as a single TCP data segment via a TCP gateway connection. For example, network host devices of autonomous systems (AS) may ordinarily transfer TCP data segments across dedicated TCP connections. These TCP connections are generally limited to the Maximum Transmission Unit (MTU) of the host device, which is lower than the MTU of a connecting TCP gateway network pipe ("TCP gateway connection") connecting the autonomous systems. An Autonomous System Boundary Router (ASBR) on one end of the TCP gateway connection may intercept a plurality of TCP data segments from the different TCP connections and may extract data messages from the plurality of TCP data segments. The ASBR may construct a TCP data segment for the TCP gateway connection that includes an aggregation of the TCP data segments of different TCP connections between routers of the distinct autonomous systems. The ASBR may communicate the appended TCP data segment via the TCP gateway connection with a higher MTU than each of the TCP connections. Upon receiving the appended TCP data segment, an ASBR on the other end of the TCP gateway connection may extract (e.g., demultiplex) the plurality of TCP data segments from the appended TCP data segment and determine, based on the connection flow information, the TCP connections of the network host devices associated with each of the separated data messages. The ASBR may then forward the separated TCP data segments to their original destination. In this way, rather than communicating the smaller TCP data segments via different TCP connections, which operate at a lower bandwidth and higher loads, the TCP data segments are communicated over a TCP gateway connection as a single coalesced TCP data segment.

In one example, a method comprises: receiving, by an ASBR of a first AS communicatively coupled to a second AS via a TCP gateway connection, a plurality of TCP data segments from a plurality of TCP connections coupling network devices of the first AS and network devices of the second AS; adding, by the ASBR, a connection identifier to each of the plurality of TCP data segments, wherein the connection identifier is associated with connection flow information of at least one of the plurality of TCP connections; appending, by the ASBR, the plurality of TCP data segments and their connection identifiers to form an appended TCP data segment; and transmitting, by the ASBR and via the TCP gateway connection, the appended TCP data segment to another ASBR of the second AS.

In another example, a method comprising: receiving, by an ASBR and via a TCP gateway connection, an appended TCP data segment, wherein the appended TCP data segment comprises a plurality of TCP data segments from a plurality of TCP connections coupling network devices of a first AS and network devices of a second AS; determining, by the ASBR, a connection identifier of each of the plurality of TCP data segments, wherein the connection identifier is associated with connection flow information of at least one of the plurality of TCP connections; separating, by the ASBR and based on the connection flow information, the appended TCP data segment into separate TCP data segments; adding, by the ASBR and based on the connection flow information, a respective TCP header to each of the separate TCP data segments for associating the separate TCP data segments to the plurality of TCP connections; and transmitting the separate TCP data segments with their respective TCP headers to the plurality of TCP connections.

In another example, an ASBR device of a first AS connected to a second AS via a TCP gateway connection, the ASBR device comprising: a memory configured to store connection flow information of at least one of a plurality of TCP connections; and a kernel executed by one or more processing units implemented using digital logic circuitry, the kernel configured to: obtain a plurality of TCP data segments from the plurality of TCP connections coupling network devices of the first AS and network devices of the second AS; adding a connection identifier to each of the plurality of TCP data segments, wherein the connection identifier is associated with the connection flow information of at least one of the plurality of TCP connections; append the plurality of TCP data segments and their connection identifiers to form an appended TCP data segment; and transmit the appended TCP data segment to another ASBR of the second AS via the TCP gateway connection.

In another example, an ASBR device of a first AS coupled to a second AS via a TCP gateway connection, the ASBR device comprising: a memory configured to store connection flow information associated with at least one of a plurality of TCP connections; and a kernel operable by one or more processing units, the kernel configured to: receive an appended TCP data segment, wherein the appended TCP data segment comprises a plurality of TCP data segments originating from the plurality of TCP connections coupling network devices of a first autonomous system (AS) and network devices of a second AS; determine a connection identifier assigned to each of the plurality of TCP data segments, wherein the connection identifier is associated with connection flow information of at least one of the plurality of TCP connections; separate the appended TCP data segment into separate TCP data segments based on the connection flow information; assign a respective TCP header to each of the separate TCP data segments for associating the separate TCP data segments to the plurality of TCP connections; and transmit the separate TCP data segments with their respective TCP headers to the plurality of TCP connections.

In another example, a computer-readable storage medium having stored thereon instructions that, when executed, cause a processor to: receive a plurality of TCP data segments from a plurality of TCP connections coupling network devices of the first AS and network devices of the second AS; add a connection identifier to each of the plurality of TCP data segments, wherein the connection identifier is associated with connection flow information of at least one of the plurality of TCP connections; append the plurality of TCP data segments and their connection identifiers to form an appended TCP data segment; and transmit the appended TCP data segment to another ASBR of the second AS via a TCP gateway connection.

In another example, a computer-readable storage medium having stored thereon instructions that, when executed, cause a processor to: receive an appended TCP data segment from a Transmission Control Protocol (TCP) gateway connection, wherein the appended TCP data segment comprises a plurality of TCP data segments from a plurality of TCP connections coupling network devices of a first autonomous system (AS) and network devices of a second AS; determine a connection identifier of each of the plurality of TCP data segments, wherein the connection identifier is associated with connection flow information of at least one of the plurality of TCP connections; separate the appended TCP data segment into separate TCP data segments based on the connection flow information; add a respective TCP header to each of the separate TCP data segments for associating the separate TCP data segments to the plurality of TCP connections based on the connection flow information; and transmit the separate TCP data segments with their respective TCP headers to the plurality of TCP connections.

The details of one or more examples are set forth in the accompanying drawings and the description below. Other features, objects, and advantages will be apparent from the description and drawings, and from the claims.

DETAILED DESCRIPTION

Figure 1:
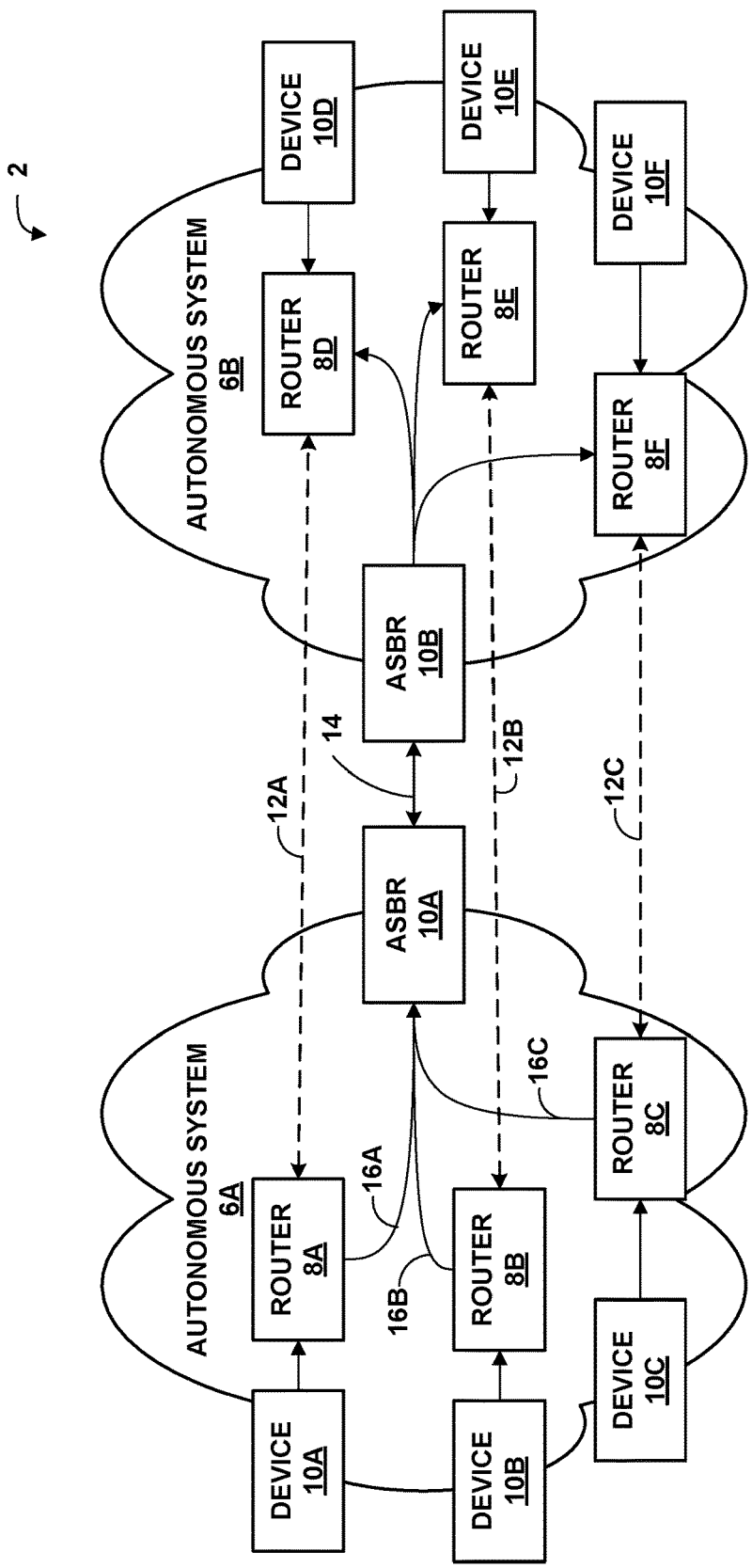
FIG. 1 is a block diagram illustrating an example network for communicating a plurality of TCP data segments from different TCP connections via a TCP gateway connection, in accordance with the techniques described in this disclosure.

FIG. 1 is a block diagram illustrating an example network 2 for communicating a plurality of TCP data segments from different TCP connections as a single appended TCP data segment via a TCP gateway connection. In the example of FIG. 1, network 2 may include two autonomous systems 6A, 6B ("AS 6"), each including various network host devices 10A-10F ("network host devices 10"), routers 8A-8F ("routers 8"), and autonomous system boundary routers 10A, 10B ("ASBR 10"). For example, AS 6A includes routers 8A-8C and ASBR 10A, whereas AS 6B includes routers 8D-8F and ASBR 10B. Each of routers 8 may establish TCP connections 12A-12C ("TCP connections 12") for network host devices 10 coupled to AS 6. Network host devices 10 may include a computer or other computing device providing information resources, services, and/or applications to users of the network. ASBR 10A and ASBR 10B may be endpoints for gateway network pipe 14 ("TCP gateway connection 14") and is communicatively coupled by a TCP connection. TCP gateway connection 14 directly couples ASBR 10A and ASBR 10B in this example.

AS 6 may represent distinct service provider networks. That is, AS 6 may be operated by distinct entities for providing services. Services that may be provided by AS 6 include, for example, private network (VPN) services, Voice over IP (VoIP), access for Asynchronous Transfer Mode (ATM) or frame relay communications, Internet protocol (IP) data services, and multimedia distribution services, such as video streaming.

Network host devices 10 may ordinarily exchange a maximum segment size (MSS) parameter that specifies the maximum TCP data segment size. The MSS exchanged between network host devices 10 is typically limited to the maximum transmission unit (MTU) on the outgoing interface of the network host device, which represents the maximum Internet Protocol (IP) packet size for a given link (e.g., TCP connections 12). In some examples, the MTU available on TCP gateway connection 14 may have a larger maximum value. That is, TCP gateway connection 14 may operate at a higher bandwidth that may handle larger size data segments. For example, network devices 10 may exchange an MSS that indicates that the TCP connections 12 have an interface MTU of 1500, whereas the MTU of the TCP gateway connection 14 is 9000.

Typically, network devices 10 are limited to its MTU on the outgoing interface when transferring data via different TCP connections 12 and are not aware of the network resource available at the gateway, e.g., TCP gateway connection 14. Network devices 10 thereby operate at a reduced bandwidth with higher loads on the TCP connections of the network despite the higher bandwidth available on TCP gateway connection 14.

In accordance with the techniques of this disclosure, ASBR 10A may append TCP data segments of different TCP connections into a single TCP data segment, and transmit the appended TCP data segment via TCP gateway connection 14. For example, network devices 10 may communicate a synchronize segment (SYN) of the TCP connections 12 and store connection flow information about the different TCP connections including a source IP address, destination IP address, source port number, destination port number, source initial sequence number (ISN), and/or destination ISN. In some examples, the structure of the connection flow information is as follows:

```
struct conn_flow {
  int src_ip;
  int dst_ip;
  short src_port;
  short dst_port;
  uint src_isn;
  uint dst_isn;
};
```

The connection flow object registers a TCP connection at each gateway end. A connection table (e.g., hash table) stores the connection flow information, and may store a respective object per TCP connection.

In one example, ASBR 10A may receive SYN messages from network host devices 10 via routers 8A-8C. ASBR 10A may extract connection flow information from the SYN messages and store the information in a connection flow table. In one example, ASBR 10A may store connection flow information for TCP connection 12A including, an IP address of network host device 10A as the source IP address, an IP address of network host device 10D as the destination IP address, a port number of network host device 10A as the source port number, a port number of network host device 10D as the destination port number, an initial sequence number for network host device 10A, and/or a destination initial sequence number for network host device 10D. Likewise, ASBR 10A may store connection flow information for TCP connections 12B and 12C. As further described below, the ASBR uses the connection flow information for aggregating (e.g., multiplexing) data messages from the different TCP data segments to a single coalesced TCP data segment, or separating (e.g., demultiplexing) the single coalesced TCP data segment into the different TCP data segments.

Each of ASBRs 10 may intercept TCP data segments 16A-16C ("TCP data segments 16") from each TCP connection 12 in either direction. ASBRs 10 may extract data messages from each of the TCP data segments 16 and add respective headers based on the connection flow information described above. For example, ASBRs 10 may add a respective connection identifier to each of the intercepted TCP data segments 16 to associate each of the data segments to its corresponding connection flow information. ASBRs 10 may determine from the connection identifier the source IP address, destination IP address, source port number, destination port number, a timestamp, and/or a recorded timestamp. In some examples, the connection identifier object is as follows:

```
struct conn_id {
  int src_ip;
  int dst_ip;
  short src_port;
  short dst_port;
  uint ts; /*timestamp*/
  uint rec_ts; /*recorded timestamp*/
};
```

In one example, ASBR 10A may intercept TCP data segments 16 from routers 8A-8C from TCP connections 12A-12C, respectively. ASBR 10A may extract the data messages from the TCP data segments 16, and may add a respective connection identifier for a network host device 10 to the data messages. For example, ASBR 10A may extract the data message from a TCP data segment 16A communicated from router 8A over TCP connection 12A. ASBR 10A may add a connection identifier associating the connection flow information of network host device 10A described above to the extracted data message. ASBR 10A may also extract the data messages from TCP data segments 16B, 16C communicated from 8B and 8C, respectively, and add connection identifiers for the extracted data messages associated with network host devices 10B, 10C.

ASBRs 10 may append (e.g., multiplex) the extracted data messages with their respective connection identifiers into a single appended TCP data segment and forward the appended TCP data segment to a socket buffer of the TCP gateway connection 14. That is, the single appended TCP data segment may utilize the higher MTU of the TCP gateway connection 14.

On the other end of TCP gateway connection 14, one of ASBRs 10 may extract (e.g., demultiplex) from the appended TCP data segment based on a lookup of the connection flow table to determine the TCP connection information for each of the different TCP data segments within the appended TCP data segment. In one example, on the receiving end of TCP gateway connection 14, ASBR 10B may separate an appended TCP data segment based on a lookup of the connection flow information associated with each data message in the appended TCP data segment. ASBR 10B may determine, based on the connection identifiers, that the extracted data messages are associated with corresponding TCP connections. ASBR 10B may add respective TCP headers associated with corresponding TCP connections to the extracted data messages, and forward the separated TCP data segments to their corresponding TCP connections. In this way, smaller TCP data segments from different TCP connections (or same connections) are transmitted as a single TCP data segment over the TCP gateway connection with a larger MTU, and separated into the different TCP connections on the other end of a TCP gateway segment, thereby achieving higher throughput and reduced network load for bulk data transfers.

According to the techniques described herein, ASBRs 10 may also configure a cumulative acknowledgement message for the appended TCP data segment transmitted over the TCP gateway connection. Rather than generating an acknowledge (ACK) message for each TCP data segment received over different TCP connections 12A-12C, ASBRs 10 may use a cumulative ACK message for the gateway TCP connection. For example, on one end of the TCP gateway connection, ASBR 10A may map a TCP gateway connection sequence number with the TCP data segment from each connection at the time of aggregating the data (further described below in FIG. 5) such that the ASBR 10A may determine how many TCP data segments from different TCP connections are being acknowledged. ASBR 10A may maintain a list of connection messages mapped to the TCP gateway connection sequence numbers in the ascending order of the sequence numbers (further described below in FIG. 6).

When the appended TCP data segment is communicated over the TCP gateway connection 14, ASBR 10B may generate a cumulative ACK message for the appended TCP data segment and communicate the cumulative ACK message over TCP gateway connection 14 back to ASBR 10A. In one example, in response to ASBR 10A receiving a cumulative ACK message on the TCP gateway connection, ASBR 10A may look up a sequence number list including a mapping of TCP gateway connection sequence numbers with the TCP data segment from each connection. Based on the lookup of the sequence number list, ASBR 10A may determine how many connection messages have been acknowledged. ASBR 10A may then generate an ACK message to each of the respective TCP connections. In this way, a cumulative ACK message delivered over the gateway TCP connection may reduce the number of ACK messages delivered and/or received.

Figure 2:
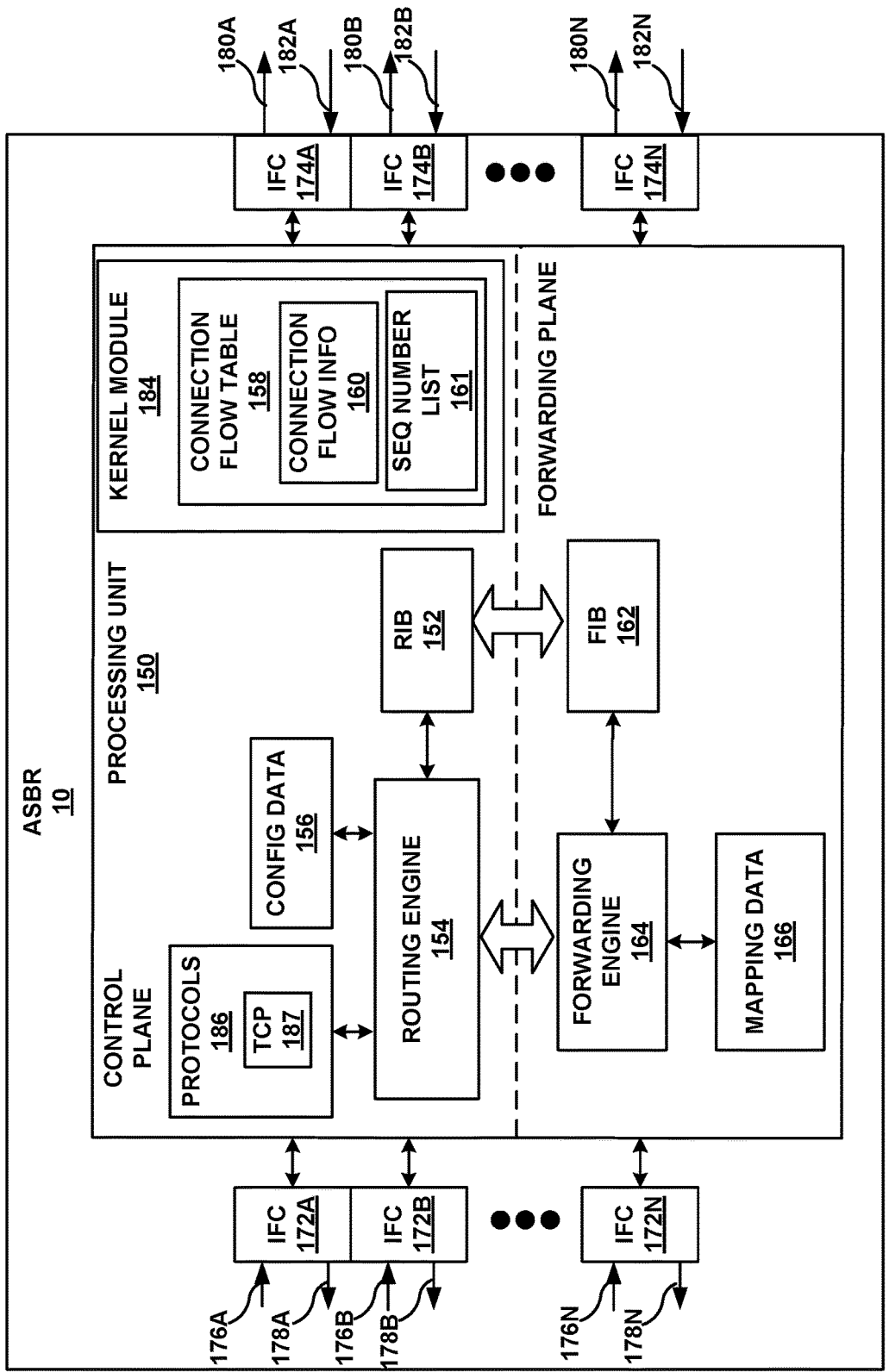
FIG. 2 is a block diagram illustrating an example ASBR of FIG. 1 in further detail, in accordance with the techniques described in this disclosure.

FIG. 2 is a block diagram illustrating an example ASBR 10 of FIG. 1 in further detail. In the example of FIG. 2, ASBR 10 includes access-facing interface cards 174A-174N ("access-facing IFCs 174") for communicating packets via inbound links 182A-182N ("inbound links 182") and outbound links 180A-180N ("outbound links 180") and core-facing interface cards 172A-172N ("core-facing IFCs 172") for communicating packets via outbound links 178A-178N ("outbound links 178") and inbound links 176A-176N ("inbound links 176"). Core-facing IFCs 172 are coupled to outbound links 178 and inbound links 176, and access-facing IFCs 174 are coupled to inbound links 182 and outbound links 180, via a number of interface ports (not shown). Each of access-facing IFCs 172 are coupled to a respective network device of AS 6A, while each of core-facing IFCs 174 are coupled to a TCP gateway connection to another ASBR. It should be understood that the letter "N" is used to represent an arbitrary number of devices, and moreover, that the number of IFCs 174 is not necessarily equal to the number of IFCs 172, although the cardinality for both IFCs 172 and IFCs 174 is designated using the variable "N."

ASBR 10 also includes processing unit 150. Processing unit 150 includes forwarding engine 164, forwarding information base (FIB) 162, routing engine 154, and routing information base (RIB) 152. Routing engine 154 may maintain RIB 152 to update and store data specifying the routes of the network. Based on RIB 152, routing engine 154 may generate forwarding information stored in FIB 162. That is, routing engine 154 generates and programs forwarding engine 164 with information in FIB 162 associating network destinations with specific next hops and corresponding interface ports of IFCs 172 in accordance with information in RIB 152. Based on the information in FIB 162, forwarding engine 164 forwards packets received from inbound links 176 to outbound links 178 that correspond to next hops associated with destination of the packets.

Processing unit 150 may be implemented in hardware, software, firmware, or any combination thereof. In one example, instructions for forwarding engine 164 are encoded in a computer-readable storage medium and are executed by a processor of processing unit 150. In other examples, forwarding engine 164 corresponds to a discrete hardware unit, such as a digital signal processor (DSPs), application specific integrated circuit (ASICs), field programmable gate array (FPGAs), or any other equivalent integrated or discrete logic circuitry or combination thereof. Similarly, routing engine 154 comprises any combination of hardware, software, and/or firmware that executes one or more routing protocols to determine routes through a network.

Routing engine 154 may implement one or more routing protocols 186 to execute routing processes. For example, routing protocols 186 may include Transmission Control Protocol (TCP) 187, for exchanging routing information with other routing devices and for updating routing information base 152. Routing protocols 186 may include other routing protocols to execute routing processes.

In accordance to the techniques described herein, processing unit 150 also includes a kernel module 184 to intercept TCP data segments from each TCP connection. When the synchronize (SYN) segment is received from one of IFCs 172, kernel module 184 may store connection flow information 160 in connection flow table 158 for a network host device and register the connection. As described above, connection flow information 160 may include source IP address, destination IP address, source port number, destination port number, source Initial Sequence Number, and/or destination Initial Sequence Number. When ASBR 10 receives a data packet associated with the registered connection from one of IFCs 172, kernel module 184 may extract the data message from the data packet and add a connection identifier header to associate the extracted data message with an associated registered connection stored in the connection flow table 158.

Kernel module 184 may append (e.g., multiplex) the extracted data messages with their connection identifiers into a single appended TCP data segment such that the appended TCP data segment is forwarded over a TCP gateway connection coupled to one of IFCs 174.

In some examples, kernel module 184 may further map a TCP gateway connection sequence number to the different TCP connections to identify the different connections to be acknowledged. A sequence number list 161 may include a list of connection messages mapped to the TCP gateway connection sequence numbers, and may be stored in ascending order of the sequence numbers. In this way, kernel module 184 may, in response to receiving a cumulative ACK message, generate respective acknowledgement messages back to corresponding TCP connections based on information in the sequence number list 161.

An ASBR 10 on the other end of the TCP gateway connection may receive the appended TCP data segment over the TCP gateway connection coupled to one of IFCs 174. Kernel module 184 may separate (e.g., demultiplex) the appended TCP data segment based on connection flow information 160 associated with each of the TCP data segments within the appended TCP data segment. For example, kernel module 184 may determine respective connection identifiers added to their corresponding TCP data segments for which kernel module 184 may lookup connection flow information 160 about the TCP data segment from connection flow table 158. Based on the connection flow information 160, kernel module 184 may add a respective TCP header to each of the separate TCP data segments for associating the separate TCP data segments to the plurality of TCP connections. Kernel module 184 may then forward the separate TCP data segments with their respective TCP headers to the corresponding TCP connections (e.g., IFCs 172).

Kernel module 184 may also, in response to receiving the appended TCP data segment, configure a cumulative ACK message and transmit the cumulative ACK message over the TCP gateway connection to the ASBR that transmitted the appended TCP data segment.

Processing unit 150 also stores configuration (config) data 156 and mapping data 166. Configuration data 156 is typically provided by an administrator to define the configuration data for ASBR 10, including specifying IFCs 172, 174, and kernel module 184.

In this manner, ASBR 10 represents an example of an ASBR to form the ends of a TCP gateway connection to multiplex and/or demultiplex a single appended TCP data segment. Furthermore, ASBR 10 in this example includes an interface communicatively coupled to a routing device, a memory configured to store a connection flow table associated with TCP connections, and one or more processing units (e.g., processing unit 150) configured to receive a plurality of data packets via the interface, determine the connection flow information associated with the corresponding data packets, add a respective header associated with the connection flow information to the data packets, append the TCP data segments and their respective headers, forward the appended TCP data segment over the TCP gateway connection, receive the appended TCP data segment over the TCP gateway connection, separate the appended TCP data segment based on a lookup of the connection flow information, add a respective TCP header associated with corresponding TCP connections, and forward the separated TCP data segments to their corresponding TCP connections.

Figure 3:
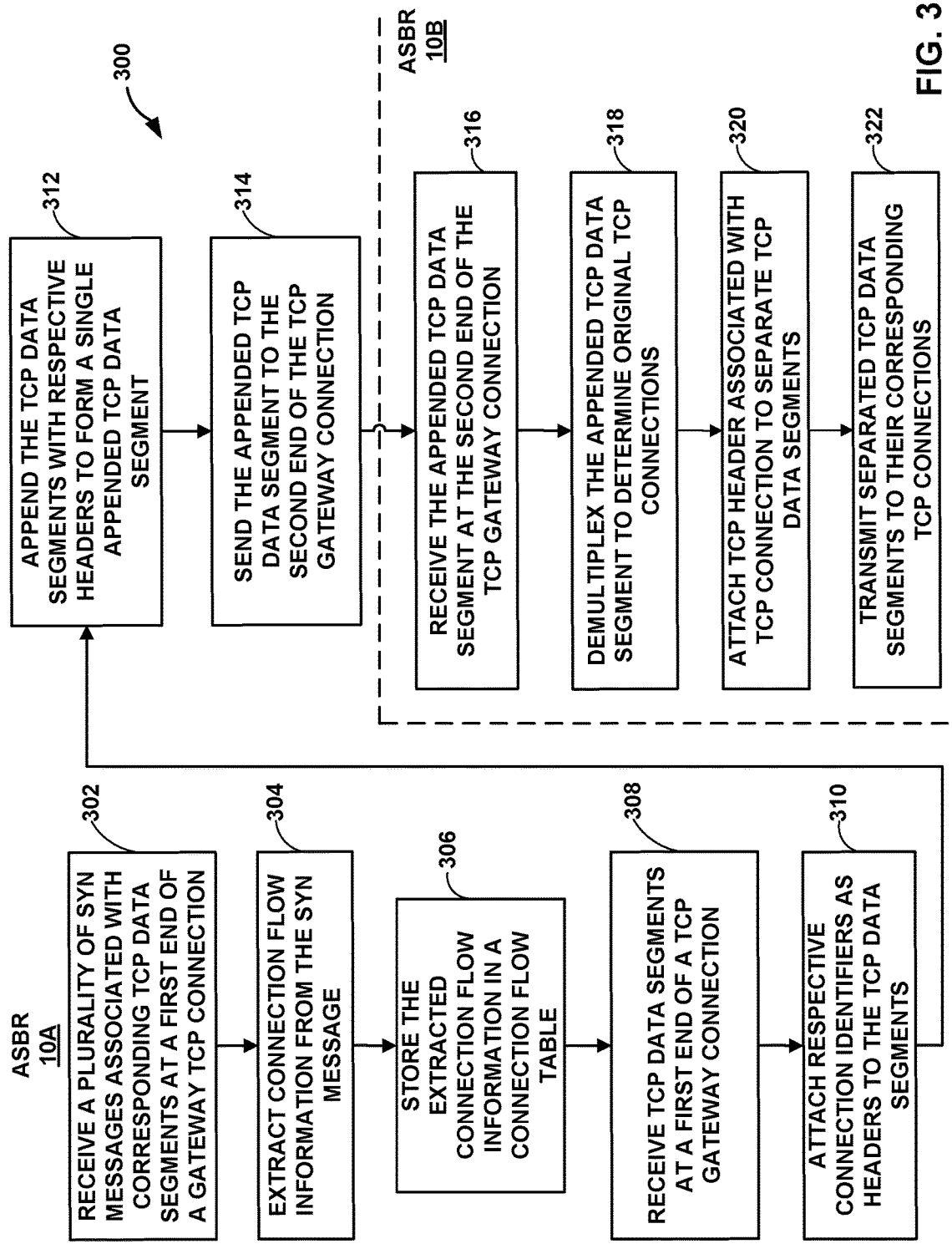
FIG. 3 is a flowchart illustrating an example method for appending TCP data segments from different TCP connections and sending the appended data segments over a TCP gateway connection, in accordance with the techniques of this disclosure.

FIG. 3 is a flowchart illustrating an example method 300 for appending TCP data segments from different TCP connections and sending the appended data segment over a TCP gateway connection, in accordance with the techniques of this disclosure. The method of FIG. 3 may be performed by, for example, ASBR 10A or ASBR 10B of FIG. 1.

Initially, ASBR 10A may receive a plurality of synchronize (SYN) messages associated with corresponding TCP data segments at a first end of a TCP gateway connection (302). As described above, kernel module 184 of ASBR 10A may receive SYN messages of TCP connections that include connection flow information associated with different connection between network host devices of the autonomous systems.

ASBR 10A may extract the connection flow information from the received SYN message (304). For example, kernel module 184 of ASBR 10A may extract the source and destination IP addresses, the source and destination port numbers, and the source and destination Initial Sequence Numbers (ISN) associated with a corresponding TCP connection.

ASBR 10A may store the extracted connection flow information in a connection flow table (306). The connection flow table may include a hash table of the object (as described in FIG. 1) per TCP connection.

ASBR 10A may receive TCP data segments at the first end of the TCP gateway connection (308). For example, the kernel module 184 of ASBR 10A may intercept individual TCP data segments from different network host devices of different connections.

ASBR 10A may add respective connection identifiers as headers based on the connection flow information to the TCP data segments (310). For example, kernel module 184 of ASBR 10A may extract a data message from the intercepted TCP data segments and add a connection identifier as a header to associate the TCP data segment with its TCP connection.

ASBR 10A may append the TCP data segments with their respective connection identifier headers to form a single appended TCP data segment (312). For example, kernel module 184 of ASBR 10A may multiplex the intercepted TCP data segments with their respective headers into a single TCP data segment.

ASBR 10A may send the appended TCP data segment to the second end of the TCP gateway connection (314). For example, kernel module 184 may forward the appended TCP data segment to one of IFCs 174 coupled to TCP gateway connection.

On the other end of the TCP gateway connection, ASBR 10B may receive the appended TCP data segment (316).

ASBR 10B may extract (e.g., demultiplex) from the appended TCP data segment (including the added respective headers) to determine original TCP connections associated with the TCP data segments in the appended TCP data segment (318). For example, kernel module 184 of ASBR 10B may perform a lookup of the connection flow table based on an added connection identifier that is associated with each TCP data segment in the appended TCP data segment. Kernel module 184 may determine based on the connection identifier the connection flow information (e.g., source and destination IP addresses, and source and destination port numbers) associated with each of the TCP data segments in the appended TCP data segment. Kernel module 184 may demultiplex the appended TCP data segment based on the connection flow information.

ASBR 10B may add a TCP header associated with a corresponding TCP connection to each of the separate TCP data segments (320). For example, kernel module 184 may, based on the connection flow information, add a respective TCP header to each of the separate TCP data segments for associating each of the separate TCP data segments to their corresponding TCP connections.

ASBR 10B may transmit the separate TCP data segments with their respective TCP headers to the corresponding TCP connections (322).

Figure 4:
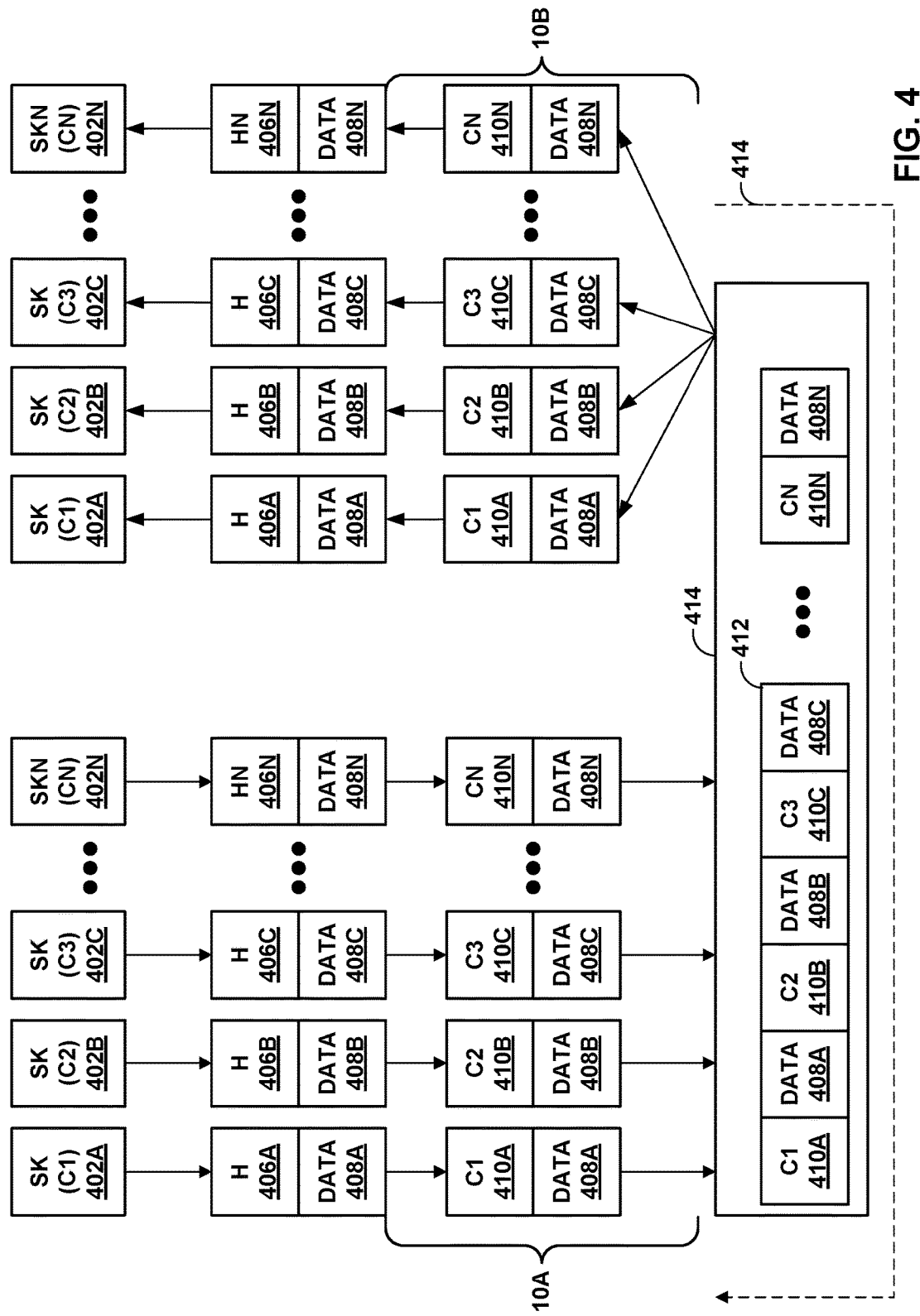
FIG. 4 is a block diagram illustrating an example of multiplexing and demultiplexing of TCP data segments, in accordance with the techniques of this disclosure.

FIG. 4 is a block diagram illustrating an example of multiplexing and demultiplexing of an TCP data segments, in accordance with the techniques of this disclosure. In the example of FIG. 4, ASBR 10A may intercept individual TCP data segments from TCP connections 12. The TCP data segments may include headers 406A-406N ("H 406") and data 408A-408N ("data 408") originating from TCP sockets 402A-402N ("SK 402" or "sockets 402").

ASBR 10A may extract data 408 from the intercepted TCP data segments and may add the respective connection identifier 410A-410N ("C 410" or "connection IDs 410"). ASBR 10A may append the data 408 and their respective connection IDs 410, to form an appended TCP data segment 412 for which to send via a gateway TCP connection 414.

On the receiving end of the gateway TCP connection, ASBR 10B may perform a lookup on the connection IDs 410 of the appended TCP data segment 412 to determine connection flow information associated with each of the data 408 within appended TCP data segment 412. Based on the connection flow information, ASBR 10B may demultiplex the messages within the appended TCP data segment 412 and may add a respective TCP header 406 associated with a corresponding TCP socket 402 to each of the separated TCP data segments.

Moreover, a cumulative TCP acknowledgement message 414 is generated to acknowledge the appended TCP data segment 412. For example, on one end of the gateway TCP connection, ASBR 10A may map TCP gateway connection sequence numbers with each of the TCP data segments from each TCP connection at the time of appending the TCP data segments (as shown below in FIG. 5). In some examples, a sequence number list of connection messages mapped to the TCP gateway connection sequence numbers is maintained in an ascending order of the sequence numbers (as shown below in FIG. 6). As and when the ASBR 10A receives a cumulative ACK message over the TCP gateway connection, ASBR 10A may look up the sequence number list to determine how many connection messages are to be acknowledged. ASBR 10A may then generate an ACK message to each of the respective TCP connections. In this way, a cumulative ACK message delivered over the gateway TCP connection may reduce the number of ACK messages received.

Figure 5:
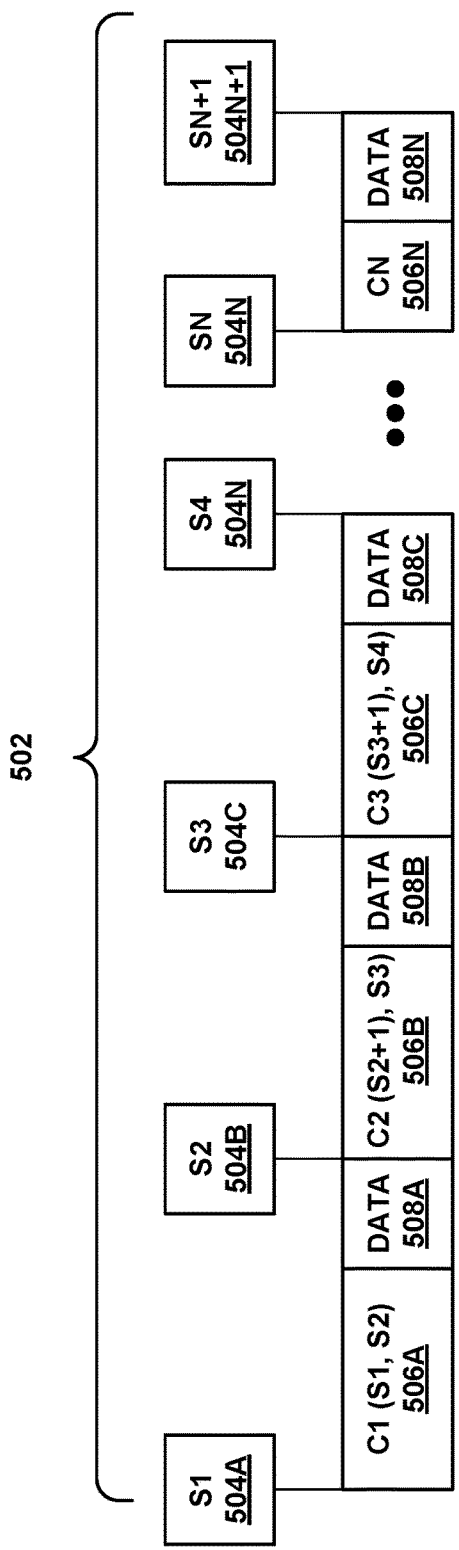
FIG. 5 is a block diagram illustrating an example of mapping sequence numbers with TCP data segments, in accordance with the techniques of this disclosure.

FIG. 5 is a block diagram illustrating an example of mapping sequence numbers with TCP data segments, in accordance with the techniques of this disclosure. In the example of FIG. 5, an ASBR may map TCP gateway sequence numbers 504A-504N ("sequence numbers 504") when appending the TCP data segments 502. Sequence numbers 504 are used to determine the number of TCP data segments from different TCP connections that are to be acknowledged.

For example, the first TCP data segment (e.g., connection ID 506A and data packet 508A) is mapped with a first sequence number 504A preceding the first TCP segment and a second sequence number 504B following the first TCP segment. Likewise, the second TCP segment (e.g., connection ID 506B and data packet 508B) is mapped with a second sequence number 504B preceding the second TCP segment and a third sequence number 504C following the second TCP segment, and so forth. ASBR 10A may determine based on the mapping of sequence numbers the number of TCP segments that are to be acknowledged.

Figure 6:
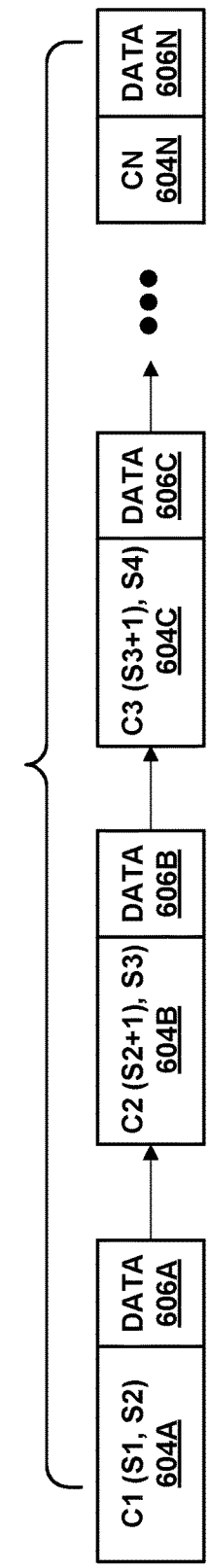
FIG. 6 is a block diagram illustrating an example list of connection messages mapped to the gateway TCP connection sequence numbers, in accordance with the techniques of the disclosure.

FIG. 6 is a block diagram illustrating an example sequence number list of TCP data segments mapped to the TCP gateway connection sequence numbers, in accordance with the techniques of the disclosure. For example, ASBR 10A may maintain a sequence number list 602 of TCP data segments mapped to the TCP gateway connection sequence numbers in the ascending order of the sequence numbers. For example, the first TCP segment (e.g., connection ID 604A and data 606A) has the lowest sequence number and is placed first in the sequence number list 602. The second TCP segment (e.g., connection ID 604B and data 606B) has the second lowest sequence number and is placed second in the sequence number list 602. Upon receiving the cumulative acknowledgement message, ASBR 10A may look up sequence number list 602 to determine how many messages have been acknowledged. ASBR 10A may then generate an ACK message to each of the respective TCP connections.

Figure 7:
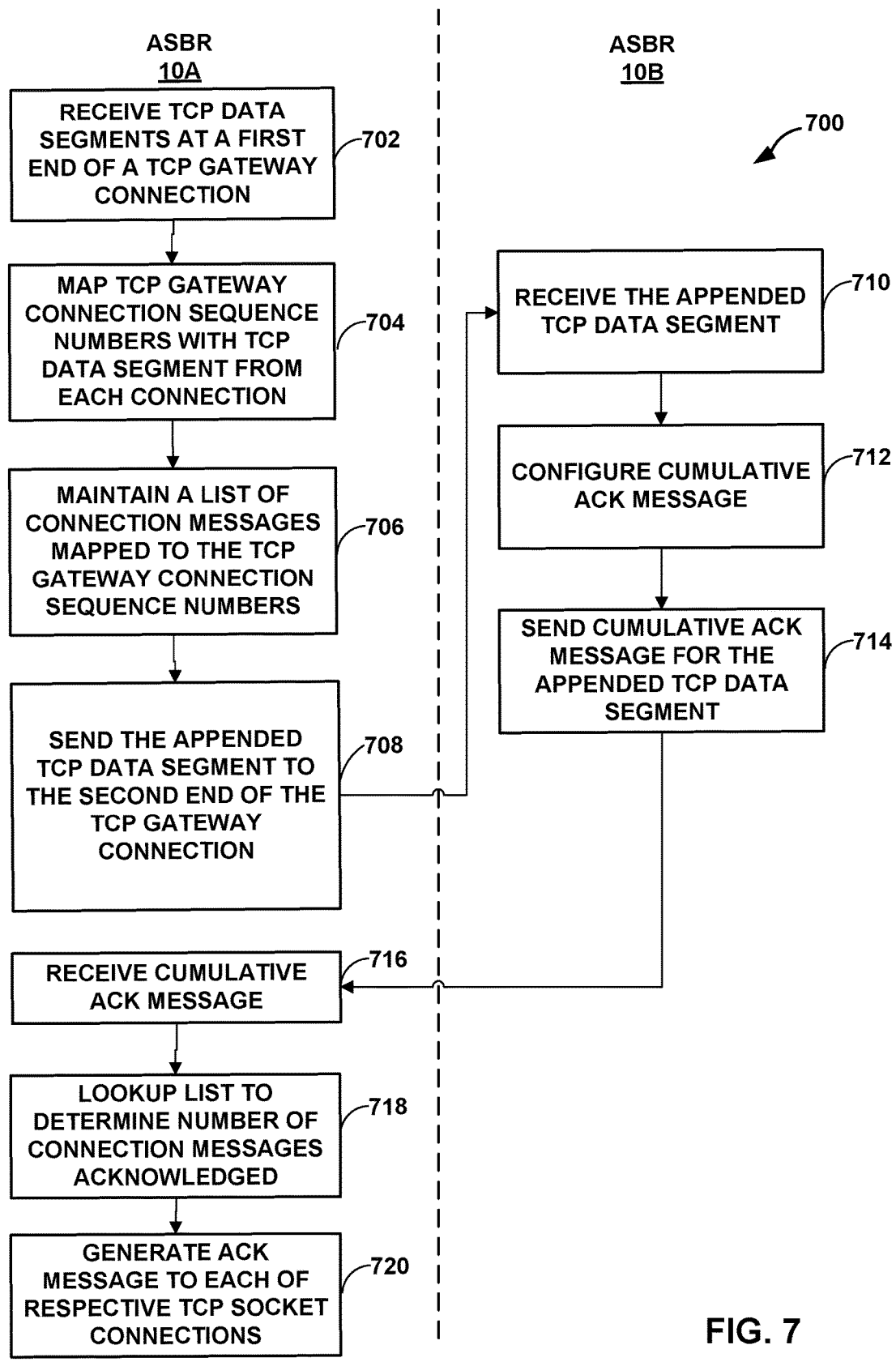
FIG. 7 is a flowchart illustrating an example method for sending and receiving a cumulative acknowledgement (ACK) message over a gateway TCP connection, in accordance with the techniques of this disclosure.

FIG. 7 is a flowchart illustrating an example method 700 for sending and receiving a cumulative acknowledgement (ACK) message over a TCP gateway connection, in accordance with the techniques of this disclosure. The method of FIG. 7 may be performed by, for example, ASBR 10A or ASBR 10B of FIG. 1.

For example, ASBR 10A may receive TCP data segments at a first end of a TCP gateway connection (702). As described above, ASBR 10A may intercept TCP data segments from network host devices at a first end of the TCP gateway connection.

ASBR 10A may map TCP gateway connection sequence numbers with each of the TCP data segments from each connection at the time of appending the TCP data segments (704). As described above in FIGS. 5 and 6, TCP gateway connection sequence numbers are used to determine the number of TCP data segments from different TCP connections that are to be acknowledged.

ASBR 10A may maintain a sequence number list of TCP gateway connection sequence numbers mapped to TCP data segments from each connection (706). As described above in FIG. 6, ASBR 10A may, for example, maintain a sequence number list of TCP data segments in an ascending order of the sequence numbers. ASBR 10A may store the sequence number list in the connection flow table or other memory.

ASBR 10A may send an appended TCP data segment to a second end of the TCP gateway connection (708).

On the other end of the TCP gateway connection, ASBR 10B may receive the appended TCP data segment (710).

In response to receiving the appended TCP data segment, ASBR 10B may configure a cumulative acknowledgement message for the appended TCP data segment (712). For example, ASBR 10B may generate a single acknowledgement message for all of the different TCP connections.

ASBR 10B may send the cumulative acknowledgement message for the appended TCP data segment over the TCP gateway connection back to ASBR 10A (714).

In response to ASBR 10A receiving the cumulative ACK message over the TCP gateway connection (716), ASBR 10A may look up the sequence number list to determine how many connection messages are to be acknowledged (718).

ASBR 10A may then generate a respective ACK message for each of the respective TCP connections (720). In this way, a cumulative ACK message delivered over the TCP gateway connection may avoid generating a plurality of ACK messages for each data message received, thereby reducing the number of ACK messages received.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising:
receiving, by an autonomous system boundary router (ASBR) of a first autonomous system (AS) communicatively coupled to a second AS via a Transmission Control Protocol (TCP) gateway connection, a plurality of TCP data segments from a plurality of TCP connections coupling network devices of the first AS and network devices of the second AS;

adding, by the ASBR, a connection identifier to each of the plurality of TCP data segments, wherein the connection identifier is associated with connection flow information of at least one of the plurality of TCP connections;

appending, by the ASBR, the plurality of TCP data segments and their connection identifiers to form an appended TCP data segment, wherein appending the plurality of TCP data segments comprises:

adding, by the ASBR, TCP gateway connection sequence numbers to each of the plurality of TCP data segments, and maintaining, by the ASBR and based on the TCP gateway connection sequence numbers, a sequence number list of TCP data segments to be acknowledged; and transmitting, by the ASBR and via the TCP gateway connection, the appended TCP data segment to another ASBR of the second AS.

2. The method of claim 1, wherein the connection flow information comprises at least a source IP address, a destination IP address, a source port number, a destination port number, a source initial sequence number (ISN), and a destination ISN.

3. The method of claim 1, wherein the connection identifier comprises at least a source IP address, a destination IP address, a source port number, a destination port number, timestamp, and a recorded timestamp.

4. The method of claim 1, further comprising:
receiving, by the ASBR, synchronize (SYN) messages for each of the plurality of TCP connections, wherein each of the SYN messages comprises the connection flow information associated with at least one of the plurality of TCP connections; and
storing, by the ASBR, the connection flow information.

5. The method of claim 1, wherein adding the TCP gateway connection sequence number comprises:
mapping, by the ASBR, the TCP gateway connection sequence number to the TCP data segment from each TCP connection; and
storing, by the ASBR, a sequence number list of the mapping.

6. The method of claim 1, further comprising:
receiving, by the ASBR and via the TCP gateway connection, a cumulative acknowledgement message for the appended TCP data segment.

7. The method of claim 6, further comprising:
in response to receiving the cumulative acknowledgement message, determining, by the ASBR, a number of TCP data segments to be acknowledged based on a sequence number list including TCP gateway connection sequence numbers mapped to each of the plurality of TCP data segments within the appended TCP data segment; and
configuring respective acknowledgement messages to the plurality of TCP connections based on the number of TCP data segments to be acknowledged.

8. A method comprising:
receiving, by an autonomous system border router (ASBR) and via a Transmission Control Protocol (TCP) gateway connection, an appended TCP data segment, wherein the appended TCP data segment comprises a plurality of TCP data segments from a plurality of TCP connections coupling network devices of a first autonomous system (AS) and network devices of a second AS, wherein the appended TCP data segment includes TCP gateway connection sequence numbers to each of the plurality of TCP data segments for which to be acknowledged;

determining, by the ASBR, a connection identifier of each of the plurality of TCP data segments, wherein the connection identifier is associated with connection flow information of at least one of the plurality of TCP connections;

separating, by the ASBR and based on the connection flow information, the appended TCP data segment into separate TCP data segments;

adding, by the ASBR and based on the connection flow information, a respective TCP header to each of the separate TCP data segments for associating the separate TCP data segments to the plurality of TCP connections; and transmitting the separate TCP data segments with their respective TCP headers to the plurality of TCP connections.

9. The method of claim 8, wherein the connection flow information comprises at least one source IP address, destination IP address, source port number, destination port number, source initial sequence number (ISN), and destination ISN.

10. The method of claim 8, wherein the connection identifier comprises at least one source IP address, destination, IP address, source port number, destination port number, timestamp, and recorded timestamp.

11. The method of claim 8, further comprising:
in response to receiving the appended TCP data segment, configuring, by the ASBR, a cumulative acknowledge message; and
transmitting, by the ASBR and via the TCP gateway connection, the cumulative acknowledge message.

12. An autonomous system boundary router (ASBR) device of a first autonomous system (AS) connected to a second AS via a Transmission Control Protocol (TCP) gateway connection, the ASBR device comprising:
a memory configured to store connection flow information of at least one of a plurality of TCP connections; and
a kernel executed by one or more processing units implemented using digital logic circuitry, the kernel configured to:
obtain a plurality of TCP data segments from the plurality of TCP connections coupling network devices of the first AS and network devices of the second AS;
adding a connection identifier to each of the plurality of TCP data segments, wherein the connection identifier is associated with the connection flow information of at least one of the plurality of TCP connections;
append the plurality of TCP data segments and their connection identifiers to form an appended TCP data segment, wherein to append the plurality of TCP data segments, the kernel is further configured to:
add a TCP gateway connection sequence number to each of the plurality of TCP data segments, and
maintain a sequence number list of TCP data segments to be acknowledged based on the TCP gateway connection sequence numbers; and transmit the appended TCP data segment to another ASBR of the second AS via the TCP gateway connection.

13. The autonomous system boundary router device of claim 12, wherein the connection flow information comprises at least a source IP address, a destination IP address, a source port number, a destination port number, a source initial sequence number (ISN), and a destination ISN.

14. The autonomous system boundary router device of claim 12, wherein the connection identifier comprises at least a source IP address, a destination, IP address, a source port number, a destination port number, a timestamp, and a recorded timestamp.

15. The autonomous system boundary router device of claim 12, the kernel further configured to:
receive synchronize (SYN) messages for each of the plurality of TCP connections, wherein each of the SYN messages comprises the connection flow information associated with at least one of the plurality of TCP connections; and
store the connection flow information in the memory.

16. The autonomous system boundary router device of claim 12, the kernel further configured to:
map the TCP gateway connection sequence number to the TCP data segment from each TCP connection; and
store a sequence number list of the mapping.

17. The autonomous system boundary router device of claim 12, the kernel further configured to:
receive a cumulative acknowledgement message for the appended TCP data segment.

18. The autonomous system boundary router device of claim 12, the kernel further configured to:
determine a number of TCP data segments to be acknowledged based on a sequence number list including TCP gateway connection sequence numbers mapped to each of the plurality of data segments within the appended TCP data segment; and
configure respective acknowledgement messages to the plurality of TCP connections based the number of TCP data segments to be acknowledged.

19. An autonomous system boundary router (ASBR) device of a first autonomous system (AS) coupled to a second AS via a Transmission Control Protocol (TCP) gateway connection, the ASBR device comprising:
a memory configured to store connection flow information associated with at least one of a plurality of TCP connections; and
a kernel operable by one or more processing units, the kernel configured to:
receive an appended TCP data segment, wherein the appended TCP data segment comprises a plurality of TCP data segments originating from the plurality of TCP connections coupling network devices of a first autonomous system (AS) and network devices of a second AS, wherein the appended TCP data segment includes TCP gateway connection sequence numbers to each of the plurality of TCP data segments for which to be acknowledged;
determine a connection identifier assigned to each of the plurality of TCP data segments, wherein the connection identifier is associated with connection flow information of at least one of the plurality of TCP connections;
separate the appended TCP data segment into separate TCP data segments based on the connection flow information;
assign a respective TCP header to each of the separate TCP data segments for associating the separate TCP data segments to the plurality of TCP connections; and
transmit the separate TCP data segments with their respective TCP headers to the plurality of TCP connections.

20. The autonomous system boundary router device of claim 19, the kernel further configured to:
in response to receiving the appended TCP data segment, configure a cumulative acknowledge message; and
transmit the cumulative acknowledge message via the TCP gateway connection.

21. A non-transitory computer-readable storage medium having stored thereon instructions that, when executed, cause a processor to:
receive a plurality of Transmission Control Protocol (TCP) data segments from a plurality of TCP connections coupling network devices of the first AS and network devices of the second AS;
add a connection identifier to each of the plurality of TCP data segments, wherein the connection identifier is associated with connection flow information of at least one of the plurality of TCP connections;
append the plurality of TCP data segments and their connection identifiers to form an appended TCP data segment, wherein to append the plurality of TCP data segments, the instructions further cause the processor to:
add a TCP gateway connection sequence number to each of the plurality of TCP data segments, and
maintain a sequence number list of TCP data segments to be acknowledged based on the TCP gateway connection sequence numbers; and
transmit the appended TCP data segment to another ASBR of the second AS via a TCP gateway connection.

22. A non-transitory computer-readable storage medium having stored thereon instructions that, when executed, cause a processor to:
receive an appended TCP data segment from a Transmission Control Protocol (TCP) gateway connection, wherein the appended TCP data segment comprises a plurality of TCP data segments from a plurality of TCP connections coupling network devices of a first autonomous system (AS) and network devices of a second AS, wherein the appended TCP data segment includes TCP gateway connection sequence numbers to each of the plurality of TCP data segments for which to be acknowledged;
determine a connection identifier of each of the plurality of TCP data segments, wherein the connection identifier is associated with connection flow information of at least one of the plurality of TCP connections;
separate the appended TCP data segment into separate TCP data segments based on the connection flow information;
add a respective TCP header to each of the separate TCP data segments for associating the separate TCP data segments to the plurality of TCP connections based on the connection flow information; and
transmit the separate TCP data segments with their respective TCP headers to the plurality of TCP connections.

* * * * *